Feb. 27, 1934. D. B. MASON 1,949,214
APPARATUS FOR PRECIPITATION OF CELLULOSE ESTERS
Filed July 2, 1931  2 Sheets-Sheet 2
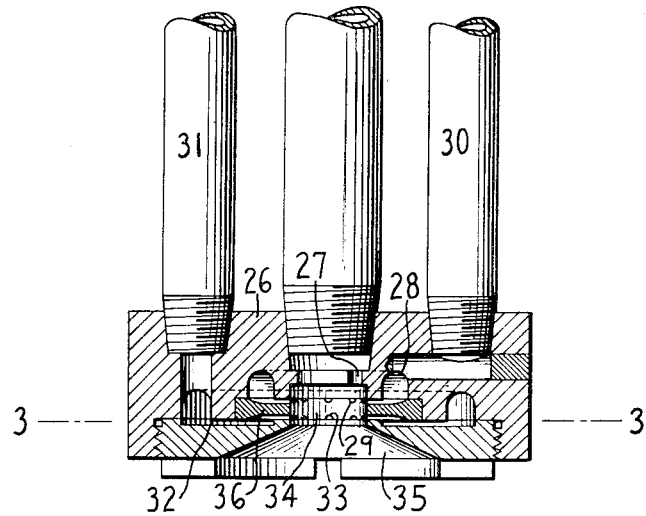
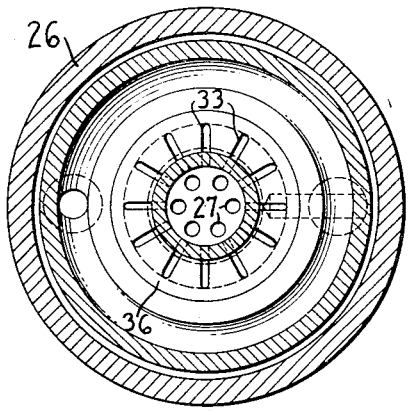

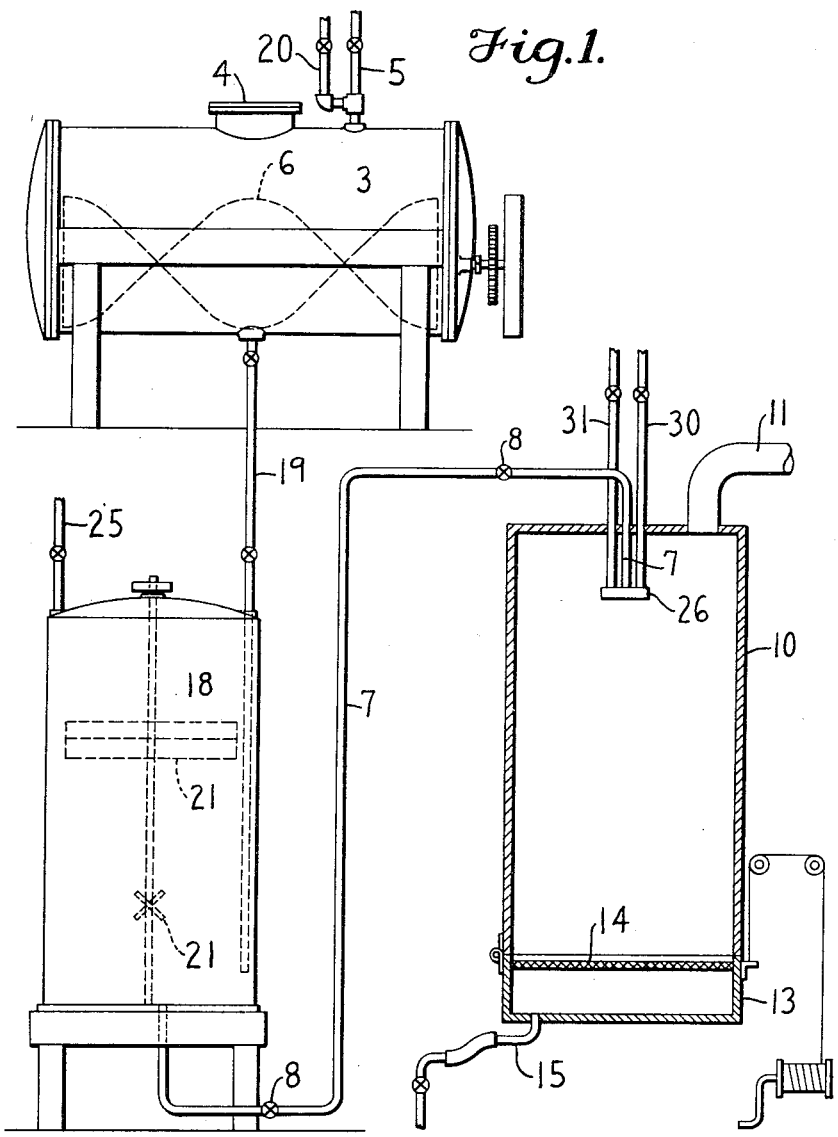

Patented Feb. 27, 1934

1,949,214

UNITED STATES PATENT OFFICE 1,949,214

APPARATUS FOR PRECIPITATION OF CELLULOSE ESTERS

Donald B. Mason, Catonsville, Md., assignor to U. S. Industrial Alcohol Co., New York, N. Y., a corporation of West Virginia Application July 2, 1931. Serial No. 548,371

7 Claims. (Cl. 18—3)

My invention relates to the manufacture and treatment of cellulose esters of organic acids, such as cellulose acetate, cellulose propionate and cellulose benzoate, in order to obtain the same in a physical condition favorable for subsequent treatments.

The object of my invention is to precipitate, or to make and precipitate, such cellulose esters in such a way that the product is light and loose, and can be easily washed, dried, bleached, put into solution for eventual use, or otherwise treated. Another object is to accomplish the precipitation with a minimum of precipitating liquid. Still another object is to reduce the expense of the recovery of any acid or other values which may be present.

The standard practice for the precipitation of such cellulose esters is to pour their solutions, or reaction mixtures, into a body of precipitating liquid.

In the patents of Lloyd M. Burghart, No. 1,816,564, dated July 28, 1931, No. 1,822,563, dated September 8, 1931, and No. 1,839,295, dated January 5, 1932, methods are disclosed of making and treating cellulose esters, for example cellulose acetate, in which liquid sulfur dioxid is employed as a reaction medium or as a solvent.

Briefly, cellulose acetate can be made by reacting cellulose, or a cellulose derivative such as hydrocellulose, in a closed pressure vessel, with a suitable acetylating agent, typically though not necessarily acetic anhydride, in the presence of liquid sulfur dioxid as a reaction medium, sulfuric acid or some other catalyst or condensing agent being preferably employed in accordance with usual practice.

The chloroform-soluble or alcohol-chloroform-soluble cellulose acetate made in this way may be precipitated, washed and dried. Cellulose acetate of some other type of solubility, such as the acetone-soluble form or one readily soluble in acetic ether (ethyl acetate), is at present more desirable, and to secure that form the reaction mixture resulting from the acetylation reaction is usually subjected to a hydration treatment, after which the mixture is precipitated to separate the cellulose acetate from the other constituents of the solution or fluid mixture.

In the Burghart patents it is disclosed that by discharging such reaction mixtures, in which the cellulose acetate is dispersed in the liquid sulfur dioxid, into contact with a precipitating liquid under such conditions that the sulfur dioxid is abruptly released as gas from within the precipitating cellulose ester, a loose product possessing a physical structure favorable for all subsequent treatments is obtainable.

My invention makes use of the Burghart discoveries and provides an improved apparatus for precipitation of cellulose acetate and other cellulose esters of organic acids, so as to obtain them in, or put them into, still lighter and looser physical condition, having the advantageous qualities in respect to subsequent treatment which have been referred to, and/or to obtain such results in an easier, more certain manner, insuring uniformity in the product, and also securing the other advantages which have been outlined.

The invention is of special advantage in connection with the employment of liquid sulfur dioxid as a reaction medium or as a solvent, since sulfur dioxid exists as a gas under ordinary conditions and therefore constitutes an ideal means for disrupting and expanding the cellulose ester product as it is being precipitated. However, my invention is not necessarily limited to the use of liquid sulfur dioxid, since it affords a way in which less volatile solvents can be vaporized or gasified in the step of precipitating cellulose esters to secure light, uniform and readily treatable products.

My invention relates, therefore, to an apparatus for precipitating cellulose acetate and like cellulose esters from reaction mixtures or solutions in which the cellulose ester is suspended or dispersed, completely or incompletely, in a liquid medium, the bulk of which, or a substantial constituent of which, is capable of being abruptly gasified or vaporized at temperatures which will not injure the cellulose ester and thereby yield a relatively enormous volume of gaseous expanding agent, under the conditions of precipitation herein described. An important feature of this apparatus is that a stream or jets of the reaction mixture or solution issuing under pressure are commingled, at the region of release, with a stream or jets of liquid acting as a precipitant or coagulant for the cellulose ester, sufficient heat being supplied to compensate for the latent heat of vaporization and to insure the abrupt release of the gas or vapors from within the precipitating material.

In this way the cellulose ester can be precipitated in a regular and uniform manner in a notably loose or fibrous condition, without the production of lumps requiring to be comminuted, and with the least amount of attention. Also, owing to the limited amount of water or other precipitating liquid employed, dilution of the acetic acid and other values which may be present is correspondingly reduced.

The heat may be conveyed by the water or other precipitating liquid itself, or other methods of heating, direct or indirect, may be employed, but preferably a jet or jets of steam or other hot vapor are introduced into the mixture, such vapor being preferably also a coagulant. Best results have been secured when the issuing cellulose ester solution is encountered first by the liquid precipitating jets and then by the vapor jets, though this may be varied.

The apparatus for performing these operations includes a nozzle or combination of nozzles arranged to effect the desired commingling of the streams and the disruption of the cellulose ester masses as they are being coagulated or precipitated. The particular design may be widely varied. The nozzle part which provides the exit for the cellulose ester reaction mixture or solution is connected by a pipe with a closed reaction chamber or vessel where the solution or mixture is held under pressure, this pipe being provided with one or more valves which are kept closed until the mixture is ready to be discharged, and which when opened allow the mixture to escape into an enclosed precipitation and expansion chamber provided with an offtake for collecting and leading away the gas or vapor generated from one or more constituents of the liquid medium in which the cellulose ester is colloidally dispersed or suspended. The nozzle part which delivers the jet or jets of liquid precipitant is connected through a valve with a source of such liquid under suitable pressure, for example a water distribution system. The vapor jet or jets are likewise connected through a valve with a suitable source of supply of steam or other vapor.

The fact that the product is secured in a uniformly light, fluffy or fibrous condition is presumably due in part to the mechanical disintegrating effect of the jets and in part to the sudden expansion of one or more of the constituents of the solution.

The operation not only improves the physical condition of the product by rendering it more easily washed and treated and more readily soluble, but also permits a minimum of precipitating agent to be used since there need be no dense masses which have to be precipitated by diffusion of the precipitating agent into the mass. For the same reasons, a minimum amount of washing is required to free the cellulose ester from traces of sulfuric acid or other catalyst and from other constituents of the solution. Consequently, the valuable constituents of the liquid wetting the precipitated cellulose ester are of such concentration as to render their ultimate recovery and precipitation comparatively easy and inexpensive.

While water and steam are the cheapest and most convenient to use in the precipitation, it may be advantageous to use some other liquid and the same or another vapor from which the values may be more readily recovered than from water.

In the accompanying drawings illustrating a form of execution of the invention:

Fig. 1 is a view partly in elevation and partly in section of a preferred combination of apparatus for the manufacture and precipitation of cellulose acetate or other cellulose esters of organic acids;

Fig. 2 is a longitudinal section through a combination nozzle; and

Fig. 3 is a section on the line 3—3 of Fig. 2.

In Fig. 1, the numeral 3 designates a closed reaction vessel adapted to retain the required pressure, this vessel being provided with a cover 4 which can be tightly closed and can be removed, and with valved inlets 5 and 20 for introducing liquid materials. Within the vessel there is a stirrer 6 arranged to be driven by power. The cellulose or cellulose derivative is placed in the vessel through the opening which is ordinarily tightly closed by the cover 4, and the liquids for acetylation, or acylation, may be introduced through the valved inlet 5.

The vessel 3 is connected with another closed pressure vessel 18 by a valved pipe 19, through which the mixture can be transferred when the valves in this pipe are opened. This vessel is preferably provided with stirrers 21, and has another valved inlet pipe 25.

A discharge pipe 7, provided with one or more valves 8, leads to a precipitation and expansion chamber 10, this chamber being enclosed and having an offtake 11 for collecting and freely carrying away sulfur dioxid or other gas or vapor, for recovery. The chamber may have a hinged bottom 13 for receiving and discharging the precipitated cellulose ester, said bottom provided with a filter 14 and a valved pipe 15 for drawing off liquid, for separation and recovery.

The end of discharge pipe 7 is connected within the chamber 10 with a downwardly directed nozzle or head 26 (Figs. 2 and 3) having a wall at the end of the pipe perforated with numerous small exit orifices 27, preferably about one-eighth inch in diameter, through which the solution or reaction mixture is delivered in the form of jets. In or around the nozzle there is an annular water channel 28 having a ring of fine exit orifices 29 arranged to produce and direct inward water jets to strike the issuing jets of the solution. This channel is connected by a valved pipe 30 with a source of supply of water under pressure. This water may be cold or may be heated to a moderate temperature. A valved steam pipe 31 communicates with another chamber 32 in or adjacent the nozzle, this chamber having a ring of fine exit orifices 33 disposed a little below or beyond the water jet orifices 29 so as to cause steam jets to strike the issuing solution already commingled with the precipitating liquid.

The exterior space 34 where the fluids commingle may be surrounded by a wall as shown and may have a flaring mouth 35, and the orifices 29 and 33 may be conveniently provided by forming radial grooves in an annular plate 36, but the various details and arrangements may be varied as desired.

The material used for esterification may be cellulose in any suitable form, or a cellulose derivative, for example hydrocellulose, and the acetylation, or acylation, may be preceded by an appropriate pre-treatment.

The following is given as a specific example.

100 parts of cellulose, 260 parts of acetic anhydride as an acetylating agent, 1000 parts of liquid sulfur dioxid, and 3 parts of sulfuric acid as a catalyst or condensing agent, are digested in the vessel 3 at a suitable temperature, preferably at about 20°–30° C., and at corresponding pressure, until test shows that the reaction has proceeded to the desired degree.

The cellulose or cellulose derivative is placed in the vessel through the opening which is ordinarily tightly closed by the cover 4, and the liquid materials may be introduced through the valved inlet 5.

During the course of the treatment the cellulose loses its original structure and the cellulose acetate dissolves in the liquid sulfur dioxid, the result at the end of this stage of the operation being that of a thickish liquid or semi-fluid mass, practically homogeneous and readily flowable through pipes under pressure of the $SO_2$ gas or vapor; the precise consistency of the fluid mass or liquid varying according to the amount of liquid medium present and other conditions.

The cellulose acetate thus produced is usually the chloroform-soluble form.

After-hydration may be carried out in the acetylation vessel 3, but for operating convenience the contents of the vessel 3 may be transferred through the valved conduit 19 into the pressure vessel 18, where the hydration treatment is effected.

Before discharging the reaction mixture from the hydration vessel a comparatively large amount of water or other coagulating agent is preferably admitted through a valved pipe 25, the amount of this agent being sufficient to bring the mass fairly close to precipitation without actually producing the change which is ordinarily termed precipitation. In other words, the solution or jell must be sufficiently fluid to flow through the pipe 7 and out through the orifices 27 under the $SO_2$ or other pressure.

This water having been incorporated, the valves 8 are opened, and the water and steam are turned through the pipes 30 and 31. The reaction mixture is then delivered through the orifices 27 into the chamber 10 and is commingled with the water and steam jets, which preferably act on the mixture in succession, with the result that the solution is broken up, the cellulose acetate is coagulated, and the sulfur dioxid gas is abruptly liberated from within the precipitating material, rupturing the expanding globules. The precipitated material is continuously thrown clear of the nozzle by the jets of steam and water and falls into the lower part of the chamber where the liquid drains or is drawn off.

The result is a cellulose ester of uniform, very loose and quite fibrous structure, its physical condition such that it lends itself readily to all subsequent treatments. The fibrous form of the product has, of course, no relation to the original cellulose fibers, but is probably due to the effect of the jets and to the manner in which thin films of the ester produced and disrupted at the moment of coagulation collapse and arrange themselves under these conditions of precipitation.

The product is finished by washing and drying in a suitable manner, or with any other treatments that may be desired at this time.

If desired, the reaction mass may be discharged and precipitated directly from the vessel 3 at the conclusion of the acetylation reaction, without undergoing a hydration treatment. It has not been thought necessary to illustrate this.

The invention may also be employed in connection with the hydration of primary cellulose acetate produced by any acetylation process.

The sulfur dioxid need not necessarily be present as a medium during acetylation or hydration, since it may be added to the reaction mixture before discharging and precipitation.

It is especially advantageous to employ liquid sulfur dioxid as the reaction and/or expanding medium, but the reaction medium may consist of a mixture of sulfur dioxid (in sufficiently large amount) and acetic acid added as such. Finally, the use of other less volatile liquids or even of compressed gases, as expanding and disrupting media is not excluded.

Other cellulose esters of organic acids can be formed by using the anhydrides or halides of the corresponding acids as acylating agents, and can then, or following an after-hydration, be precipitated in accordance with this invention, to obtain products having the desired physical condition and behavior in respect to subsequent treatment.

Furthermore, the mode of precipitation is well adapted for the re-treatment of already manufactured cellulose esters of this class. Thus, cellulose acetate, cellulose propionate, etc., previously completely manufactured by any process, can be put in solution in liquid sulfur dioxid in a closed pressure vessel and can then be discharged and precipitated in the manner and by the means set forth, to improve its physical condition.

Instead of water, non-aqueous precipitating liquids, such as carbon tetrachlorid, benzene, toluene and the like may be employed, and instead of steam the heated vapors of such liquids may be utilized; also expanding media more (or even less) volatile than sulfur dioxid may be employed.

While the preferred form of apparatus has been described in detail, it will be understood that the general features of the invention may be embodied in forms differing from that illustrated.

I claim:

1. Apparatus for precipitating cellulose esters from solutions and like flowable mixtures, comprising a valved discharge pipe connected with a pressure vessel for containing the solution, a nozzle on the end of said pipe, and means for delivering jets of precipitating liquid to commingle with the cellulose ester solution issuing from said nozzle, and means for supplying sufficient heat at the region of precipitation to volatilize abruptly a constituent of the mixture with disruptive effect upon the precipitating ester.

2. Apparatus for precipitating cellulose esters from solutions and like flowable mixtures, comprising a nozzle; means for discharging cellulose ester solution from the nozzle; a plurality of conduits in positions to direct jets at the stream of solution discharged from the nozzle; means for supplying a precipitating liquid to said conduits under sufficient pressure to cause the jets of liquid discharged from the conduits to thoroughly mix with the cellulose ester solution; and valves for controlling the supply of liquid to the nozzle and conduits, respectively.

3. Apparatus for precipitating cellulose esters from solutions and like flowable mixtures, comprising a pressure vessel for containing the solution; a valved discharge pipe leading from said vessel; a nozzle at the end of the pipe; conduits for directing jets at the stream of cellulose ester solution discharged from the nozzle; means for supplying precipitating liquid and hot vapor to the conduits with sufficient pressure to cause jets of liquid and vapor which commingle with the solution from the nozzle to disrupt the stream and precipitate the cellulose ester.

4. Apparatus for precipitating cellulose esters from solutions and like flowable mixtures, comprising a nozzle; means for discharging cellulose ester solution from the nozzle; a plurality of conduits in positions to direct jets at the stream of solution discharged from the nozzle; means for supplying a precipitating liquid to said conduits under sufficient pressure to cause the jets of liquid discharged from the conduits to thoroughly mix with the cellulose ester solution; other conduits in positions to direct jets of hot vapor against the stream after it has passed the liquid discharging conduits; and means for supplying hot vapor to said other conduits.

5. In apparatus for precipitating cellulose esters from solutions and like flowable mixtures, a nozzle head having orifices for discharging a cellulose ester solution; a pipe for connecting the nozzle head with a vessel containing the solution under pressure; a chamber within the nozzle head for a precipitating liquid; a conduit through which precipitating liquid is supplied to the chamber; and a wall of the nozzle head surrounding the cellulose ester solution stream and having a ring of orifices communicating with the chamber, said orifices being directed to discharge the precipitating liquid into the solution stream.

6. In apparatus for precipitating cellulose esters from solutions and like flowable mixtures, a nozzle head having a recessed face and orifices for discharging streams of cellulose ester solution from said recessed face, two rows of other orifices in the side wall of the recess, the orifices of said rows being directed to discharge jets into the streams of cellulose ester solution; three separate chambers in the nozzle head, one of which communicates with the orifices for discharging the cellulose ester solution, and the others of which each communicate with one of said rows of orifices; a conduit for supplying cellulose ester solution to the solution chamber; a conduit for supplying a precipitating liquid to the chamber which communicates with one row of orifices; and a conduit for supplying a hot vapor to the chamber which communicates with the other row of orifices.

7. In apparatus for precipitating cellulose esters from solutions and like flowable mixtures, a nozzle head having a recessed face and orifices for discharging streams of cellulose ester solution from said recessed face, two rows of other orifices in the side wall of the recess, said rows being located at different distances from the solution discharging orifices, the orifices of said rows being directed to discharge jets into the streams of cellulose ester solution; three separate chambers in the nozzle head, one of which communicates with the orifices for discharging the cellulose ester solution, and the others of which each communicate with one of said rows of orifices; a conduit for supplying cellulose ester solution to the solution chamber; a conduit for supplying a precipitating liquid to the chamber which communicates with the row of orifices closest to the solution discharging orifices; and a conduit for supplying a hot vapor to the chamber which communicates with the other row of orifices.

DONALD B. MASON.